V. A. ASPLUND.
ATTACHMENT FOR STEERING WHEELS.
APPLICATION FILED MAR. 6, 1914.

1,128,088.

Patented Feb. 9, 1915.

WITNESSES

INVENTOR
Vio Albert Asplund
BY
ATTORNEYS

UNITED STATES PATENT OFFICE.

VIO ALBERT ASPLUND, OF GLENBURN, NORTH DAKOTA.

ATTACHMENT FOR STEERING-WHEELS.

1,128,088. Specification of Letters Patent. Patented Feb. 9, 1915.

Application filed March 6, 1914. Serial No. 822,829.

*To all whom it may concern:*

Be it known that I, VIO ALBERT ASPLUND, a citizen of the United States, and a resident of Glenburn, in the county of Renville and State of North Dakota, have invented a new and Improved Attachment for Steering-Wheels, of which the following is a full, clear, and exact description.

My invention relates to a hand rest or gripping attachment applicable to the periphery of a steering wheel, to afford positive abutments or resistance members to prevent the operator's hand from slipping on the wheel, and to enable him to obtain a better grip.

An object of my invention is to provide an efficient device adapted to be secured in pairs to the steering wheel, and of a character to permit of the hands of the operator assuming convenient positions.

The invention will be more particularly explained in the specific description following.

Reference is to be had to the accompanying drawings forming a part of this specification, in which similar characters of reference indicate corresponding parts in all the views.

Figure 1:
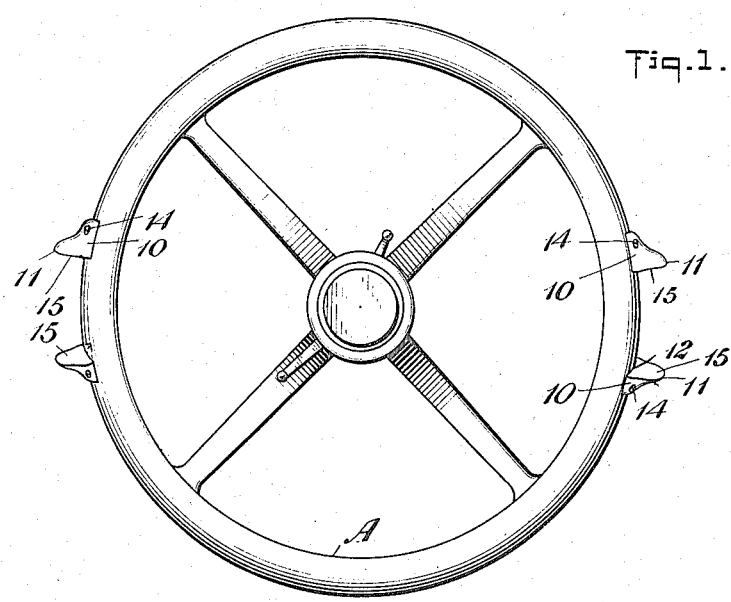
Figure 2:
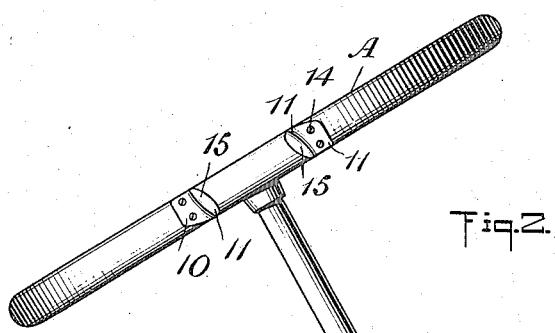
Figure 3:
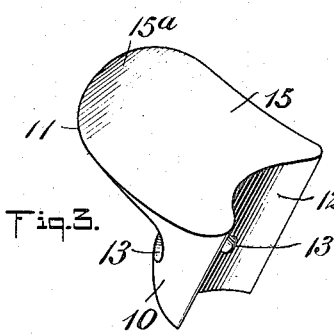
Figure 4:
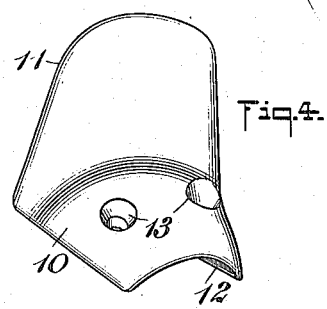

Figure 1 is a plan view of a steering wheel having my invention applied to; Fig. 2 is a side view of the wheel with the attachment applied; Fig. 3 is a front perspective view of one of the devices; and Fig. 4 is a rear perspective view.

The device embodying the invention is applicable to any steering wheel A, at the periphery. The devices are preferably employed in pairs, and each device consists of a base 10 and a lug 11 thereon. The under side of the base is concaved transversely, as at 12, to conform to the transverse peripheral surface of the wheel rim. The bottom is provided with holes 13 to receive screws 14 or equivalent fastening members, the screws being adapted to take into holes tapped for the purpose in the rim. The front face of the lug 11 is approximately perpendicular to the base and may be slightly concaved at the top, as indicated at 15ª in Fig. 3. The faces 15 have such a relation to the concaved surfaces 12 of the base, that a pair of the devices when applied to a wheel, will present opposed faces spirally disposed on the periphery. The members of a pair are spaced apart a distance to receive the hand of the operator, and the opposed spiral faces of the pair will be parallel with each other, or approximately so. In practice pairs of the devices may be provided on the wheel, the one pair diametrically opposite the other.

By means of the invention the driver may conveniently grip the wheel between the pairs of attachments, and the latter will thus form abutments that will prevent the operator's hands from slipping on the wheel rim, and the operator will thereby be enabled to hold a better grip on the wheel, and to maintain the grip and resist the tendency of the steering wheel to turn should one of the running wheels strike an obstruction.

Having thus described my invention, I claim as new, and desire to secure by Letters Patent:

1. An attachment for a steering wheel, comprising a pair of members each consisting of a base, and a lug rising therefrom, the base being concaved transversely to conform to the transverse curvature of the wheel rim, and the lug being spirally disposed with respect to the said concave base.

2. A steering wheel having diametrically opposed thereon pairs of attachments, each attachment consisting of a base, and a lug, the lugs of a pair presenting faces approximately parallel to each other, and spirally disposed on the periphery of the rim.

3. An attachment for steering wheels, consisting of a pair of transversely concaved separate base elements and an outwardly projecting member on each base presenting a face inclined to the said concaved base, the two elements being adapted to be applied to a wheel rim to define the sides of an intermediate space, of which the lateral surface of the rim will define the bottom surface, the inclined members being disposed obliquely, at the sides of the defined space.

4. A steering wheel having on the rim thereof, an outwardly projecting member presenting a face disposed spirally with respect to the rim.

In testimony whereof I have signed my name to this specification in the presence of two subscribing witnesses.

VIO ALBERT ASPLUND.

Witnesses:
 ED. S. HEALY,
 BUE HERMANSON.